3,316,285
TOLUYLENE DIISOCYANATE MIXTURE
Thomas H. Cleveland, New Martinsville, W. Va., assignor to Mobay Chemical Company, Pittsburgh, Pa., a corporation of Delaware
No Drawing. Filed Dec. 31, 1964, Ser. No. 422,551
2 Claims. (Cl. 260—453)

This invention relates to a new polyisocyanate, and more particularly to a new isomeric mixture of toluylene diisocyanate and to a method for making polyurethanes. This application is a continuation-in-part of my application Ser. No. 760,541, filed Sept. 12, 1958, now abandoned.

The method most generally employed for the preparation of toluylene diisocyanate involves, first, a two-step nitration of toluene with a nitric acid-sulfuric acid mixture to produce 2-nitrotoluene in the first step and 2,4-dinitrotoluene and 2,6-dinitrotoluene in the second step. The product of the nitration step contains approximately 76% by weight of 2,4-dinitrotoluene and about 19% by weight of 2,6-dinitrotoluene, in addition to some unreacted toluene, nitrotoluene and side-reaction products.

Secondly, the mixture of the dinitrotoluene isomers is fed into hydrogenators and thereby reduced to toluylene diamine, obtained as the corresponding mixture of isomers.

The toluylene diamine is generally dissolved in an aromatic solvent, preferably monochlorobenzene or ortho-dichlorobenzene and reacted with phosgene in a two-stage process to prepare the carbamyl chloride which, with the continued introduction of phosgene, yields the diisocyanate.

The crude product thus obtained contains approximately 80% of the 2,4-isomer and about 20% of the 2,6-isomer, and can be used as such in certain applications, or distilled to obtain a pure 80/20 isomeric mixture. Therefore, the 80/20 isomeric mixture is the natural product obtained from the nitration of toluene.

When the use of polyisocyanates was first developed in Europe, however, the 80/20 isomeric mixture was found to be too highly reactive for efficient use with the resin systems then available. A cellular polyurethane prepared with the highly reactive 80/20 isomer mixture had a closed cell structure and developed splits and voids and even collapsed in some instances before an adequate cure could take place. As a consequence, since the state of technological development was not sufficient to permit the tailoring of resin systems to complement the 80/20 isomer mixture of toluylene diisocyanate, the isomer mixture itself was tailored to complement the resin systems then available. Consequently, the development of polyurethane plastics, and in particular, cellular polyurethanes was carried out in Europe using a 65/35 isomer mixture of toluylene diisocyanate (65% 2,4-toluylene diisocyanate/35% 2,6-toluylene diisocyanate) obtained directly by the nitration of o-nitrotoluene followed by reduction and phosgenation. With the use of more highly branched and correspondingly more highly reactive resins, the 65/35 isomer mixture afforded some measure of success since it is less reactive with the more highly reactive resins yielding a cross-linked polymer. However, it was not possible to obtain a polymer that was not cross-linked and substantially linear with these components and, as a result, the full development of polyurethane plastics has been somewhat retarded.

The technology developed in the United States was, however, advanced enough to tailor-make resin systems to complement the more reactive 80/20 isomer mixture. The development of polyurethanes therefore proceeded at a rapid rate with the use of the more reactive isomer mixture and the use of linear or slightly branched resins to prepare softer, more flexible foams as well as the preparation of rigid foams from the more highly cross-linked resin systems with the 65/35 isomer mixture or the more reactive 80/20 isomer mixture.

However, with the development of tailor-made resins to complement the 80/20 isomer mixture of toluylene diisocyanate, the problem was not entirely solved. Cross-linked cellular materials prepared with the 80/20 mixture had closed cells and tended to shrink severely. Thus, though a temporary solution to the use of more reactive isomer mixtures of toluylene diisocyanate appeared in the tailor-made resin systems therefor, additional problems appeared and have until now prevented the fullest possible development of polyurethane plastics for all the purposes for which they are adaptable.

Further, the added bother, expense and inconvenience necessitated by the requirement that the resin system must be chosen according to the isomeric mixture or vice versa is a highly impractical factor. Consequently, the development of polyurethane plastics to their fullest extent depends upon an adequate remedy of the foregoing difficulties.

It is therefore an object of this invention to provide a polyisocyanate which is devoid of the foregoing disadvantages.

It is a further object of this invention to provide a polyisocyanate which has a high degree of reactivity without the tendency of the 80/20 isomeric mixture to yield a closed cell foam which shrinks in a reaction with a branched resin system.

Still another object of this invention is to provide a polyisocyanate with which all types of resin systems are efficient.

Still another object of this invention is to provide polyurethane plastic compositions prepared from the new polyisocyanate which may be fabricated without special tailoring of the components to suit one another.

The foregoing objects and others which will become apparent from the following description are accomplished in accordance with this invention, generally speaking, by providing a polyisocyanate comprised of an isomeric mixture of from about 72 to about 76 percent 2,4-toluylene diisocyanate and from about 24 to about 28 percent 2,6-toluylene diisocyanate.

The discovery of one optimum efficiency isomer ratio of toluylene diisocyanate for the production of polyurethane in general is vital to the full development of polyurethane technology. This optimum efficiency ratio has been found to lie in the mixture of about 72 to about 76 percent of the 2,4-isomer of toluylene diisocyanate and about 24 to about 28 percent of the 2,6-isomer of toluylene diisocyanate, the most highly desirable ratio being about 74 percent 2,4-toluylene diisocyanate to about 26 percent 2,6-toluylene diisocyanate. This isomer ratio allows a maximum latitude in the formulation of flexible as well as rigid polyurethane foams, polyurethane elastomers, coatings, films, fibers, caulks and sealants and the like.

Considering polyurethane foams, the polyisocyanate of this invention is useful in the preparation of cellular polyurethanes by the reaction between the polyisocyanate and an organic compound containing at least two active hydrogen atoms as determined by the Zerewitinoff method in the presence of a blowing agent. Suitable processes for the preparation of a cellular polyurethane plastic are disclosed in U.S. Reissue Patent 24,514 together with a suitable apparatus for mixing the components. When water is added as the blowing agent, corresponding quantities of excess isocyanate to react with the water and produce carbon dioxide should be used. It is also possible to proceed with the preparation of polyurethane plastics including polyurethane foams by a prepolymer technique wherein an excess of organic polyisocyanate is reacted in a first step with a polyol to prepare a prepolymer having free —NCO groups which is then reacted in a second step with water to prepare a foam. However, instead of water, low boiling hydrocarbons such as pentane, hexane, heptane, pentene, heptene and the like, halogenated hydrocarbons such as dichlorodifluoroethane, dichlorodifluoromethane, trichlorofluoromethane, vinylidene chloride, methylene chloride and the like or mixtures thereof, azo compounds such as azohexahydrobenzodinitrile and the like may also be used as blowing agents.

Alternately, the components may be reacted in a single step, if desired, with the use of a suitable catalyst, such as stannous chloride, a stannous salt of a carboxylic acid having from 1 to 18 carbon atoms, a trialkyl tin oxide, a dialkyl tin chloride, a dialkyl tin oxide or a dialkyl tin salt of a carboxylic acid having from 1 to 18 carbon atoms. These catalysts may be used alone or in combination with any other suitable catalytic compound, preferably a tertiary amine, such as triethylene diamine, N,N,N',N'-tetramethyl butylene diamine, a 1-alkyl-4-(dialkyl amino alkylene) piperazine in which the alkyl radicals have from 1 to 4 carbon atoms and the alkylene radical has from 2 to 4 carbon atoms, N-ethyl morpholine, or any of those which are disclosed in U.S. Patents 2,948,928, 2,941,967, and 2,948,691.

With reference to polyurethane foams, the present isomer ratio is particularly ideal for the production of polyester and polyether based cellular products, both flexible and rigid. With reference to polyester-based polyurethane foams, typical components of the resin are saturated chemical monomers such as diethylene glycol and adipic acid. Small mol fractions of such trifunctional reactants as trimethylolpropane are usually also added to the polyisocyanate-resin reactants to produce a limited controlled functionality in the cellular product. Some typical resins now in general use are the same as or similar to those used heretofore and throughout the history of the development of polyester urethane foams and include for an example those tabulated below.

TABLE 1

| Polyester Resin Type | A | B | C | D | E |
|---|---|---|---|---|---|
| Hydroxyl number | 40 | 50 | 50 | 50 | 60 |
| Average branch points/molecule | 0 | 0.3 | 0.5 | 0.6 | 0.8 |
| Commercial example | [1] Z | [2] Y | [3] X | [4] W | [5] V |

[1] Molecular weight of about 2,100; hydroxyl number of about 56; adipic acid and diethylene glycol condensate.
[2] 70 parts Z and 30 parts V.
[3] 60 parts V and 40 parts Z.
[4] Molecular weight of about 2,900; hydroxyl number of about 50; adipic acid, diethylene glycol and trimethylol propane condensate.
[5] Molecular weight of about 2,200; hydroxyl number of about 57; adipic acid, diethylene glycol and trimethylol propane condensate.

Polyester resins of this type are normally formulated having only hydroxyl terminal groups, and have very low acid numbers.

The varying functionality of the polyester resins as indicated above requires each individual resin used in a foam formulation, to be reacted with a toluylene diisocyanate isomer mixture having a certain predetermined ratio of the 2,4 to the 2,6 isomer which can vary only slightly within a characteristic very limited range. Highly unsatisfactory products are obtained when isomer ratios which fall outside of the narrowly restricted range are used, with the result that in some cases, the cellular product even collapses and becomes completely useless. Considering the isomer ratios from the point of view of the 2,4 isomer, where a concentration higher than the optimum 2,4-toluylene diisocyanate isomer limit is present, closed cell structures are obtained with the above resins leading to severe shrinkage in the product. Where lower concentrations than the minimum 2,4-toluylene diisocyanate limit are used, the foam develops splits and fissures and even collapses on occasion before adequate curing of the foam can take place. The necessity for varying the isomer ratio depending on the resin system to be used in preparing the cellular polyurethane is thus apparent. Considering the polyester defined in the previous table, the proper isomer ratio to be used with each is as follows:

TABLE 2

| Polyester resin type: | Desired percent 2,4 isomer in toluylene diisocyanate |
|---|---|
| A | No satisfactory range. |
| B | 73 to 88. |
| C | 70 to 84. |
| D | 68 to 82. |
| E | 62 to 75. |

It is evident, then that the common 80/20 isomer ratio is satisfactory in the preparation of a polyurethane foam only from polyester types B, C, and D. The standard 65/35 isomer ratio can only be used to prepare satisfactory foams with polyester type E. Further, the properties of the foam prepared vary depending on which isomer mixture is chosen or required and which resin system must necessarily be used with it.

Cellular polyurethanes prepared from the 65/35 isomer ratio and polyester resin type E are stiffer foams having high load bearing properties, from which low density foam products may far more easily be prepared than from other combinations.

Cellular polyurethanes prepared using the 80/20 isomer ratio and polyester resin type C or D are softer and possess ideal draping characteristics to make them useful as interlining for clothing. When polyester resin type B is used in combination with the 80/20 isomer ratio, a cellular polyurethane having superior processing characteristics and ideal properties for the preparation of 4 to 6 pound cubic foot foams results.

Therefore, in order to produce a cellular polyurethane having certain physical and mechanical properties, it is necessary to pick the right isomer ratio for the right resin type to produce the right combination for the right processability and properties. The discovery of an isomer ratio of toluylene diisocyanate which obviates the need to pick exactly the right reactants to make the kind of foam desired has therefore revolutionized the development of polyurethanes. It has been considered extremely improbable if not entirely impossible that one isomer ratio would ever be capable of giving the same results obtained when each of the two isomer ratios are used with each of the resin types tailored to suit it. Yet, it has now been discovered that a single product containing from about 72 to about 76 percent of the 2,4 isomer of toluylene diisocyanate and from about 24 to about 28 percent of the 2,6 isomer of toluylene diisocyanate will allow all of the most desirable types of polyester urethane foams to be produced with none of the apprehensions heretofore attendant on their preparation.

The preparation of satisfactory polyether urethane foams is also limited to certain combinations of polyol type and toluylene diisocyanate isomer ratio.

The major portion of the commercial flexible polyurethane foams produced from polyethers is based on formulations containing a 3,000 molecular weight polyoxypropylene ether triol and a blend of 80/20 toluylene diisocyanate isomers. For a more highly cross-linked stiffer foam, however, the concentration of the 80/20 blend of 2,4- and 2,6-toluylene diisocyanate required to react stoichiometrically with the polyether and water of the foam formulation results in severe foam shrinkage caused by closed cell structures. A more satisfactory foam may be prepared from polyethers by using an isomer blend containing a lower proportion of the 2,4 isomer; however, if less than the minimum amount of the 2,4 isomer is used considering the type of polyether resin being used, then the foam will contain voids and tend to collapse.

Therefore, it has been found that the best isomer ratio to use with polyether triols in the most important molecular weight range of from about 1,000 to about 3,000 is from about 72 to about 76 percent of the 2,4 isomer of toluylene diisocyanate to about 24 to about 28 percent of the 2,6 isomer of toluylene diisocyanate. Other polyether types yield results with the isomer ratio of the invention which are comparable to those achieved in the 65/35 or 80/20 isomer ratio, whichever is demanded by the exigencies of the resin.

For a comparative study of the characteristics of foams prepared using the two conventional isomer ratios of toluylene diisocyanate as opposed to the use of the isomer ratio of this invention, the table below collates data obtained using polyoxypropylene ether triols of varying molecular weights with these isocyanates to prepare a foam:

TABLE 3

| Molecular Weight of Polyoxypropylene Ether Triol | Foam Processing Characteristics Using Toluylene Diisocyanate Blend Containing Indicated Percent 2,4 Isomer | | |
|---|---|---|---|
| | 65 | 74 | 80 |
| 1,000 | Satisfactory foam. | Some closed cells and shrinkage. | Severe closed cells and shrinkage. |
| 1,500 | Voids. | Satisfactory foam. | Serious closed cells and shrinkage. |
| 3,000 | do | do | Satisfactory foam. |

As has already been demonstarted with polyester-based polyurethane foams, polyether-based polyurethane foams are best prepared using the single isomer ratio of this invention to achieve products having the most generally desirable characteristics.

Although the discussion of the advantageous aspects of the isomer ratio of this invention has been confined specifically to polyurethane foam formulations, it is to be understood that the isomer ratio discussed herein is correspondingly of maximum efficiency in the preparation of polyurethane elastomers, coatings, caulks and sealants, films, fibers, and any other type of polyurethane product. Because of the versatility of the isomer ratio of the present invention, any suitable organic compound containing at least two reactive hydrogen atoms which are reactive with NCO groups may be used to react with the polyisocyanate in the preparation of any type of polyurethanes, the selection of the active hydrogen containing compound to be dictated only by the type of product desired. Further, either a one-shot method or a prepolymer technique may be used to formulate the polyurethane.

Some suitable active hydrogen containing compounds which may be used in the preparation of these polyurethanes are, for example, any suitable organic compound containing at least two active hydrogen containing groups as determined by the Zerewitinoff method. Generally speaking, any compound having an active hydrogen atom as defined above which will react with an NCO group may be used. Hydroxyl groups react with NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

Any suitable hydroxyl polyester, including lactone polyesters, may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be difunctional compound including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorus acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diimine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polyethioether may be used such as, for example, the condensation product of thiodiglycol or the reaction product of a polyhydric alcohol such as is disclosed above for the preparation of the hydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanol-amine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butanediene-1,4-diol, 2-pentene-1,5-diol, 2-hexene-1,6-diol, 2-heptene-1,7-diol and the like; alkyne diols such as, for example 2-butyne-1,4-diol, 1,5-hexadiyne-1,6-diol and the like; alkane triols such as, for example, 1,3,6-hexanetriol, 1,3,7-heptane triol, 1,4,4-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2-phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

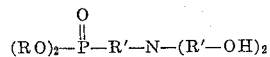

wherein R is lower alkyl or phenyl, for example, methyl, ethyl, propyl, butyl and the like and R' is alkylene, preferably having from 1 to 4 carbon atoms such as, methylene, ethylene, 1,2-propylene, 1,4-butylene and the like. A preferred compound is dioxyethylene-N,N-bis-(2 hydroxyethyl) aminomethyl phosphonate.

Any of the compounds of any of the classes set forth above may be substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methylethyl amino and the like; mercapto, carbonyl, thiocarbonyl, phosphoryl, phosphato and the like.

Any suitable stabilizer or emulsifier may be used in the production of cellular polyurethanes such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

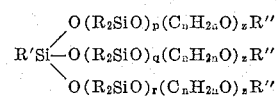

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

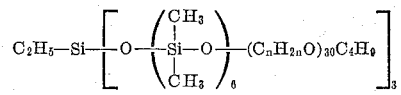

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091. Other suitable compounds may therefore have the formula

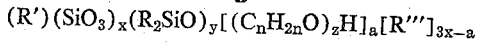

where $x$ is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that methods of determining the chain length of the polysiloxane chains and the polyalkylene chains give values which represent average chain lengths. In the above formula R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si$— where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

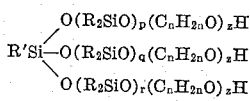

where $p+q+r$ has a minimum value of 3, the other subscripts being the same as in the immediately foregoing formula. In this instance, all three of the oxyalkylene chains are joined to the end of polysiloxane chains of the type $-(R_2SiO)-$. Specifically, one could use

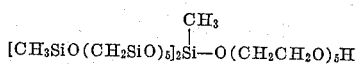

In addition, any type of additive may be added in order to achieve the type of polyurethane desired including pigments and dyestuffs, fillers of any suitable type, plasticizers and emulsifiers where desired, and so on. Any suitable such materials may be incorporated into the polyurethane being prepared.

Where elastomeric products which are non-porous are to be prepared, the organic compound containing active hydrogen containing groups may be reacted with an excess of the polyisocyanate of this invention in a first step to prepare an isocyanato-terminated prepolymer under substantially anhydrous conditions. The prepolymer is then reacted in a second step with any suitable chain extending agent which has a molecular weight less than about 500 and which contains active hydrogen atoms which are reactive with NCO groups. Some such suitable compounds are, for example, polyhydric alcohols, polyamines, amino alcohols and the like. Any suitable polyhydric alcohol may be used such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(beta-hydroxy ethyl ether), 1,3-phenylene-bis-(beta-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-caproic acid dihydrazide, gamma-hydroxy butyric hydrazide, bis-semicarbazide, bis-hydrazine carbonic esters of glycols such as many of the glycols heretofore mentioned and the like. The resulting elastomer prepared by mixing the prepolymer with the cross-linking or chain-extending agent may then be cast into a mold, extruded or spun into fibers or treated in any desired manner. Similar elastomers may also be prepared where all the reactants are mixed in one stage.

The isomer ratio of this invention may also be used for the production of polyurethane coating compositions. In this case, the organic compound containing active hydrogen containing groups is reacted with the polyisocyanates of the invention in an inert organic solvent therefor, such as, for example, ethyl acetate, methyl formamide, the diethyl ether of diethylene glycol, benzene, xylene, benzine and the like.

A particularly preferred coating composition is based on a solution of a branched polyester such as, for example, one obtained by reacting a trihydric alcohol, a dihydric alcohol and a dicarboxylic acid together in a first step to prepare a polyester having an hydroxyl number of from about 50 to about 150; then combining the resulting polyester with an organic solvent such as, for example, the methyl ester of ethylene glycol acetate, preferably at approximately a 50 percent solution, then reacting the resulting solution of the polyester with a solution of the polyisocyanate. Any suitable trihydric alcohol may be used in the preparation of the polyester such as, for example, glycerine, trimethylol propane, 1,2,6-hexane triol and the like and any suitable dihydric alcohol may be used such as, for example, 1,4-butylene glycol, 1,3-butylene glycol, ethylene glycol and the like. Any suitable dicarboxylic acid may be used such as, for example, adipic acid, sebacic acid and the like. It is to be understood that this is a preferred formulation and that coating compositions with the other active hydrogen containing compounds are also contemplated by the invention.

The polyurethanes thus prepared from the isomer ratio of this invention possess processability characteristics and physical and mechanical properties which equal those of polyurethanes prepared using isomer ratios to which resin systems have, of necessity, been tailored according to the type of polyurethane product desired. All the caution required in the choice of reactants to insure a good polyurethane product according to the choice of resin, or according to the choice of isomer ratio is now obviated. With the single isomer ratio defined herein, polyurethanes of outstanding characteristics may be prepared and utilized as polyurethanes have been prepared and used heretofore without the need to refrain from using certain resins with an isomer ratio which will react with other resin systems with which a second isomer ratio will not produce good results.

The polyurethanes prepared from the isomer ratio of this invention are especially useful for any application in which polyurethanes are generally employed in such forms as, for example, foams, coatings, elastomers, adhesives, caulks and sealants and so forth.

The invention is further illustrated but is not intended to be limited by the following examples in which all parts and percentages are by weight unless otherwise specified.

EXAMPLE I

*The preparation of 72 to 76 percent 2,4 and 24 to 28 percent 2,6-toluylene diisocyanate*

The isomer ratio of this invention may be prepared in a number of different ways. Some such suitable methods are, for example:

A. About 5 parts of 80/20 toluylene diisocyanate are mixed with about 50 parts of n-hexane and cooled to a temperature of about −5° C. Crystals form which are made up of about 98 percent of 2,4-toluylene diisocyanate while the filtrate contains an isomer ratio of about 70 percent of the 2,4 isomer and about 30 percent of the 2,6 isomer of toluylene diisocyanate. The isocyanate is distilled from the filtrate from which the toluylene diisocyanate crystals are filtered. A sufficient amount of the filtered off 2,4-toluylene diisocyanate to make up the desired isomer ratio is added to the 70/30 isomer mixture obtained from the filtrate.

B. An isomer ratio of toluylene diisocyanate comprised of about 80 percent of the 2,4 isomer and about 20 percent of the 2,6 isomer, or any other isocyanate isomer ratio which contains more than 72 percent of the 2,4-toluylene diisocyanate isomer may be treated in accordance with the method outlined in U.S. Patent 2,831,012, which is incorporated herein by reference, in order to obtain the isomer ratio of this invention.

C. The isomer ratio of this invention may be prepared from toluene by making the mononitro derivative of toluene which is comprised of from about 55 to about 60 percent of ortho-nitrotoluene, about 2 to 5 percent of meta-nitrotoluene and about 35 to about 40 percent of para-nitrotoluene. The isomer ratio is distilled and about 68 to about 80 percent of the ortho-nitrotoluene isomer and about 20 to about 31 percent of the para-nitrotoluene are nitrated to obtain the respective 2,4 and 2,6 isomers. The dinitrotoluene isomers thus obtained are then reduced to the corresponding toluylene diamine isomers which are dissolved in monochlorobenzene and reacted with phosgene to yield an isocyanate isomer mixture of between about 72 to about 76 percent of the 2,4 toluylene diisocyanate isomer and about 28 to about 24 percent of the 2,6 toluylene diisocyanate isomer.

D. Beginning with a mixture of toluylene diamine isomers, one may also prepare the isocyanate of this invention by treating the isomer ratio at hand according to the method outlined in U.S. Patent 3,149,162, which is incorporated herein by reference.

E. One of the simplest ways to prepare the isocyanate isomer ratio of this invention is to use the commercially available isocyanate isomer ratios, that is, 65/35 and 80/20 toluylene diisocyanates. In that instance, the isocyanate isomer ratio of this invention may be readily prepared by mixing about 6 parts of the 65/35 isomer with about 9 parts of the 80/20 isomer mixture.

Any other suitable method may also be used to prepare the isomer ratio of this invention.

EXAMPLE II

About 2000 parts of a glycol adipic acid polyester having an hydroxyl number of about 53 are dehydrated for about 2 hours at about 130° C. under about 12 mm. of pressure in a vacuum kneading machine. About 760 parts of an isomer mixture of about 74 percent 2,4-toluylene diisocyanate and about 26 percent of 2,6-toluylene diisocyanate are added and after a period of about 20 minutes about 790 parts of orthodichlorobenzedine are introduced. After some time the viscosity of the melt, which is at first thinly liquid, increases and after another about 15 minutes a crumbly, storable product is obtained which may thereafter be molded. A very good elastomeric product is obtained.

EXAMPLE III

A prepolymer is prepared by reacting about 23 parts of a polyhydric polyalkylene ether prepared by condensing about 174 parts (3 mols) of propylene oxide with about 67 parts (0.5 mole) of hexanetriol to an hydroxyl number of about 232 and a molecular weight of about 723, with about 17 parts of a mixture of about 74 percent 2,4-toluylene diisocyanate and about 26 percent 2,6-toluylene diisocyanate. This reaction product is then dissolved in a mixture of 20 parts of Cellosolve acetate and 40 parts of xylol. The prepolymer prepared is applied by brushing in a thin film onto a surface. The coating is permitted to cure in moist air at a temperature of about 90° C. for about 3 hours. The resulting polyurethane coated surface exhibits high abrasion and solvent resistance with good adhesion between the surface and the polyurethane. A suitable polyurethane coating may also be prepared from the isocyanate isomer ratio of this invention in a one-step process using any suitable active hydrogen containing compound and solvent.

EXAMPLE IV

About 100 parts of a polyether triol having a molecular weight of about 3000 and prepared by the condensation of propylene oxide with trimethylol propane, about 49 parts of a mixture of 74 percent 2,4-toluylene diisocyanate and 26 percent 2,6-toluylene diisocyanate, about 4 parts of water, about 0.3 part of a tertiary amine catalyst, about 1.3 parts of a stabilizer having the formula

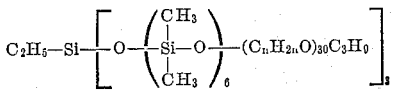

wherein $(C_nH_{2n}O)$ is a mixed polyoxyethylene and oxypropylene block copolymer containing 17 oxyethylene units and about 13 oxypropylene units, about 1 part of a plasticizer such as, for example, $C_6H_4(COOC_{10}H_{21})_2$ and about 0.5 part of stannous octoate are mixed together substantially simultaneously in an apparatus of the type disclosed in U.S. Reissue Patent 24,514. The resulting mixture is discharged from the apparatus and chemical reaction occurs almost instantaneously, with the reaction mixture beginning to foam and expand. After the chemical reaction has subsided the expanded cellular mixture solidifies into a cellular polyurethane having a density of about 1.4 lbs./cubic ft., a tensile strength of about 19.8, and an elongation of about 240. The compression set of the product at 22 hours, 90 percent is 9.2.

When a cellular polyurethane was prepared using the same formulation but substituting as the isocyanate a mixture of about 65 percent 2,4-toluylene diisocyanate and about 35 percent 2,6-toluylene diisocyanate, a product was obtained which had voids and tended to develop splits.

EXAMPLE V

About 100 parts of a polyester having a molecular weight of about 2200 and an hydroxyl number of about 57 and prepared by the condensation of adipic acid, diethylene glycol and trimethylol propane, about 4 parts of a tertiary amine, about 1 part of the reaction product of 2 parts of oleic acid and 1 part of diethyl amine, about 1.5 parts of a surfactant, about 4.5 parts of water and about 54 parts of a mixture of about 75 percent 2,4-toluylene diisocyanate and about 25 percent of 2,6-toluylene diisocyanate are mixed together substantially simultaneously in an apparatus of the type disclosed in U.S. Reissue Patent 24,514. The resulting mixture is discharged from the apparatus and chemical reaction occurs almost instantaneously with the reaction mixture beginning to foam and expand. When the reaction has subsided a solid cellular polyurethane is obtained which has a density of about 1.5, a tensile strength of about 22.5 and an elongation of about 220, a compression set at 22 hours, 90 percent, of about 28.

When a cellular polyurethane was prepared using the same formulation but substituting an isomer ratio of about 80 percent 2,4-toluylene diisocyanate and about 20 percent of 2,6-toluylene diisocyanate for the isocyanate in the above formulation, a product was obtained which had a closed cell structure and which underwent a severe degree of shrinkage.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims. Further, any of the compounds referred to herein as suitable for the same purpose may be substituted for the reactants used in the preceding examples.

What is claimed is:

1. An isomeric mixture of toluylene diisocyanate consisting essentially of from about 72 to about 76 percent by weight of 2,4-toluylene diisocyanate and from about 24 to about 28 percent by weight of 2,6-toluylene diisocyanate.

2. An isomeric mixture of toluylene diisocyanate consisting essentially of about 74 percent 2,4-toluylene diisocyanate and about 26 percent 2,6-toluylene diisocyanate.

References Cited by the Examiner

UNITED STATES PATENTS

| | | | |
|---|---|---|---|
| 2,394,597 | 2/1946 | Dickey | 260—453 |
| 2,611,782 | 9/1952 | Bortnick | 260—453 |
| 2,831,012 | 4/1958 | Bernard | 260—453 |
| 2,866,774 | 12/1958 | Price | 260—77.5 |
| 2,929,800 | 3/1960 | Hill | 260—77.5 |
| 3,217,024 | 11/1965 | Park et al. | 260—453 |

OTHER REFERENCES

Du Pont Bulletin HR–10, Urethane Resilient Foams Made from Polyesters, Feb. 15, 1956.

CHARLES B. PARKER, *Primary Examiner.*

LEON J. BERCOVITZ, *Examiner.*

RICHARD L. RAYMOND, MATTHEW C. JACOB, DALE R. MAHANAND, *Assistant Examiners.*